US012034240B2

(12) United States Patent
Yang et al.

(10) Patent No.: US 12,034,240 B2
(45) Date of Patent: Jul. 9, 2024

(54) ELECTRICAL CONNECTION TERMINAL AND ELECTRICAL CONNECTION ASSEMBLY

(71) Applicant: Tyco Electronics (Shanghai) Co. Ltd., Shanghai (CN)

(72) Inventors: Yuchen Yang, Shanghai (CN); Xiao (Nichee) Zhou, Shanghai (CN)

(73) Assignee: Tyco Electronics (Shanghai) co., Ltd., Shanghai (CN)

(*) Notice: Subject to any disclaimer, the term of this patent is extended or adjusted under 35 U.S.C. 154(b) by 26 days.

(21) Appl. No.: 17/717,198

(22) Filed: Apr. 11, 2022

(65) Prior Publication Data

US 2022/0336987 A1 Oct. 20, 2022

(30) Foreign Application Priority Data

Apr. 14, 2021 (CN) ......................... 202110402459.4

(51) Int. Cl.

| | |
|---|---|
| ***H01R 13/04*** | (2006.01) |
| ***H01R 4/02*** | (2006.01) |
| ***H01R 4/18*** | (2006.01) |
| ***H01R 13/11*** | (2006.01) |

(52) U.S. Cl.

CPC ............. *H01R 13/04* (2013.01); *H01R 4/023* (2013.01); *H01R 4/184* (2013.01); *H01R 13/113* (2013.01)

(58) Field of Classification Search

CPC ........ H01R 13/04; H01R 4/023; H01R 4/184; H01R 13/113; H01R 4/029; H01R 4/20; H01R 11/01; H01R 2201/26; H01R 13/10; H01R 24/00; H01R 13/629; H01R 4/18; H01R 13/533; B60L 53/16

See application file for complete search history.

(56) References Cited

U.S. PATENT DOCUMENTS

| | | | | |
|---|---|---|---|---|
| 5,588,884 | A * | 12/1996 | Rudoy | H01R 31/02 439/787 |
| 5,957,734 | A * | 9/1999 | Gladd | H01R 13/28 439/857 |
| 6,461,172 | B2 * | 10/2002 | Ross | H05K 1/0263 439/907 |
| 7,722,372 | B2 * | 5/2010 | Matsumoto | H02M 7/003 174/68.2 |
| 9,692,163 | B1 * | 6/2017 | Didonato | H01R 4/70 |
| 10,256,560 | B2 * | 4/2019 | Fertig | H01R 13/35 |
| 11,817,639 | B2 * | 11/2023 | Yi | H01R 12/57 |
| 2002/0025732 | A1 * | 2/2002 | Hsieh | H01R 13/187 439/845 |
| 2003/0190846 | A1 * | 10/2003 | Costa | H01R 4/625 439/845 |

(Continued)

*Primary Examiner* — Truc T Nguyen

(57) ABSTRACT

An electrical connection terminal and an electrical connection assembly are disclosed. The electrical connection terminal has a base, and a plurality of tabs connected to the base. The plurality of tabs are separated from each other, and each of the plurality of tabs is adapted to mate with a mating terminal in a plug-in manner. In the present invention, the electrical connection terminal adopts a plurality of parallel tabs, so the length of the electrical connection terminal and the current flow path through the electrical connection terminal are reduced. Therefore, the electrical connection terminal of the present invention has low body resistance, less heating and is more suitable for high current applications.

14 Claims, 12 Drawing Sheets

(56) References Cited

U.S. PATENT DOCUMENTS

| | | | | |
|---|---|---|---|---|
| 2014/0127954 | A1* | 5/2014 | Ando | H01R 13/187 439/884 |
| 2015/0038000 | A1* | 2/2015 | Glick | H01R 13/113 439/370 |
| 2015/0093929 | A1* | 4/2015 | Zhang | H01R 13/113 439/355 |
| 2016/0254627 | A1* | 9/2016 | Byrne | H01R 11/01 439/119 |
| 2019/0379142 | A1* | 12/2019 | Yamada | H01R 43/0207 |
| 2022/0239032 | A1* | 7/2022 | Nakai | H01R 13/521 |

* cited by examiner

ELECTRICAL CONNECTION TERMINAL AND ELECTRICAL CONNECTION ASSEMBLY

CROSS-REFERENCE TO RELATED APPLICATION

This application claims the benefit of Chinese Patent Application No. 2021104024594 filed on Apr. 14, 2021 in the State Intellectual Property Office of China, the whole disclosure of which is incorporated herein by reference.

BACKGROUND OF THE INVENTION

Field of the Invention

The present invention relates to an electrical connection terminal and an electrical connection assembly including the electrical connection terminal.

Description of the Related Art

In the prior art, in order to realize the rapid charging of the electric vehicle, the electrical connection terminal used to electrically connect the charging battery of the electric vehicle must carry a large current. However, in the prior art, the electrical connection structure of the electrical connection terminal is mostly a single plug-in piece, and the length of the single plug-in piece is large, which will lead to a long current flow path, a high body resistance and a large calorific value, which greatly limits the size of charging current and cannot be applied to higher charging current.

SUMMARY OF THE INVENTION

The present invention has been made to overcome or alleviate at least one aspect of the above mentioned disadvantages.

According to an aspect of the present invention, there is provided an electrical connection terminal comprises a base and a plurality of tabs connected to the base, the plurality of tabs are separated from each other, and each of the plurality of tabs is adapted to mate with a mating terminal in a plug-in manner.

According to an exemplary embodiment of the present invention, the plurality of tabs extend downward along a thickness direction of the base to simultaneous mate with a plurality of mating terminals, respectively.

According to another exemplary embodiment of the present invention, the electrical connection terminal comprises two tabs arranged side by side, which are respectively connected to both sides of the width direction of the base and perpendicular to the width direction of the base.

According to another exemplary embodiment of the present invention, the electrical connection terminal comprises three tabs, which are arranged side by side and perpendicular to the width direction of the base.

According to another exemplary embodiment of the present invention, two of the three tabs are respectively connected to both sides of the width direction of the base, and the remaining one of the three tabs is connected to the middle part of the width direction of the base.

According to another exemplary embodiment of the present invention, the electrical connection terminal comprises three tabs, two of the three tabs are arranged side by side and perpendicular to the width direction of the base, and the remaining one of the three tabs is arranged perpendicular to the length direction of the base.

According to another exemplary embodiment of the present invention, two of the three tabs are respectively connected to both sides of the width direction of the base, and the remaining one of the three tabs is connected to one end of the length direction of the base.

According to another exemplary embodiment of the present invention, the plurality of tabs are arranged in a row along the width direction of the base; or the plurality of tabs are arranged in a column along the length direction of the base; or the plurality of tabs are arranged in multiple rows along the width direction of the base and columns along the length direction of the base.

According to another exemplary embodiment of the present invention, the electrical connection terminal further comprises a connection part, which is connected to the base and adapted to be electrically connected to an end of a cable.

According to another exemplary embodiment of the present invention, the connection part is in a flat plate shape, and the flat plate-shaped connection part is adapted to be welded onto the end of the cable; or the connection part is cylindrical, and the cylindrical connection part is adapted to be crimped onto the end of the cable; or the connection part is side wing-shaped, and the side wing-shaped connection part is adapted to be crimped onto the end of the cable.

According to another exemplary embodiment of the present invention, the connection part extends in a direction parallel to the length direction of the base; or the connection part extends at a predetermined angle with respect to the length direction of the base.

According to another exemplary embodiment of the present invention, the electrical connection terminal comprises two tabs, which are respectively connected to both sides of the width direction of the base, so that the electrical connection terminal is in a U-shape.

According to another exemplary embodiment of the present invention, at least some of the plurality of tabs are arranged side by side and parallel to each other.

According to another aspect of the present invention, there is provided an electrical connection assembly comprises of: the above electrical connection terminal, and a conductive component, an end of which is electrically connected to the base of the electrical connection terminal.

According to an exemplary embodiment of the present invention, the end of the conductive component includes a flat connecting surface which is in contact with and electrically connected with the upper or lower surface of the base.

According to another exemplary embodiment of the present invention, the conductive component is a cable or a bus bar.

According to another exemplary embodiment of the present invention, the electrical connection assembly further comprises a connector housing, the electrical connection terminal is fixedly installed in the connector housing.

According to another aspect of the present invention, there is provided an electrical connection assembly comprises a first electrical connection terminal and a mating terminal. The first electrical connection terminal comprises of: a first base; and a plurality of first tabs connected to the first base and separated from each other. The mating terminal comprises a first mating end mated with the first tab of the tab.

According to another exemplary embodiment of the present invention, the electrical connection assembly further comprises a second electrical connection terminal. The second electrical connection terminal comprises a second base, and a plurality of second tabs connected to the second base and separated from each other. The mating terminal also includes a second mating end mated with the second tab.

In the above exemplary embodiments according to the present invention, the electrical connection terminal adopts a plurality of parallel tabs, so the length of the electrical connection terminal and the current flow path through the electrical connection terminal are reduced, and the current flow path through the electrical connection terminal after shunting is shorter. Therefore, the electrical connection terminal of the present invention has low body resistance, less heating and is more suitable for high current applications.

In the above exemplary embodiments according to the present invention, a plurality of tabs increase the cross-sectional area and surface area of the electrical connection terminal, which improves the equivalent current sectional area and effective heat dissipation area of the electrical connection terminal, making the electrical connection terminal more suitable for high current applications.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
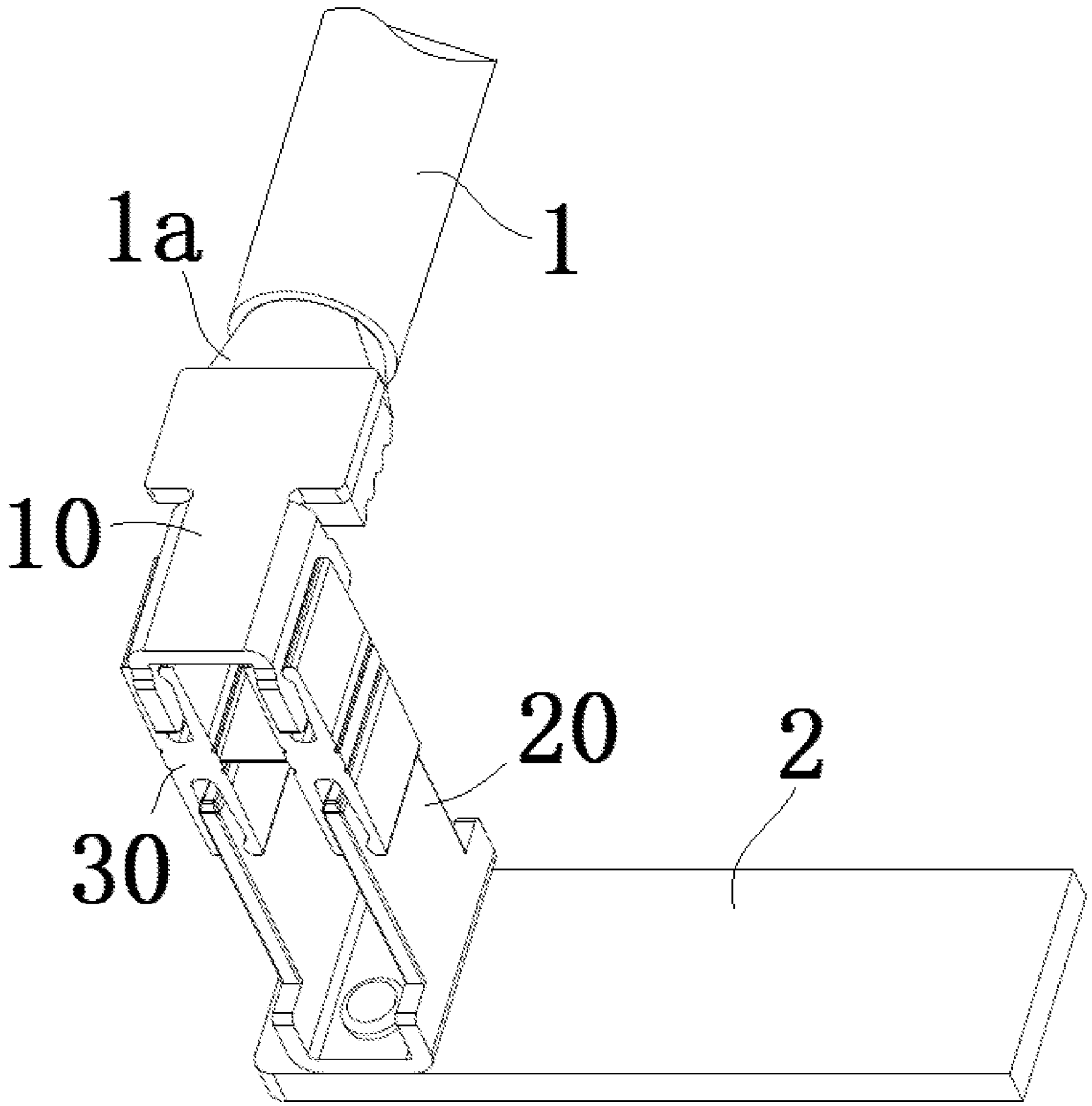
FIG. 1 shows an illustrative perspective view of an electrical connection assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided an electrical connection terminal comprises a base and a plurality of tabs connected to the base, the plurality of tabs are separated from each other, and each of the plurality of tabs is adapted to mate with a mating terminal in a plug-in manner.

FIG. 1 shows an illustrative perspective view of an electrical connection assembly according to an exemplary embodiment of the present invention.

As shown in FIG. 1, in the illustrated embodiment, the electrical connection assembly mainly includes a first electrical connection terminal 10, a second electrical connection terminal 20 and a plurality of mating terminals 30.

Figure 2:
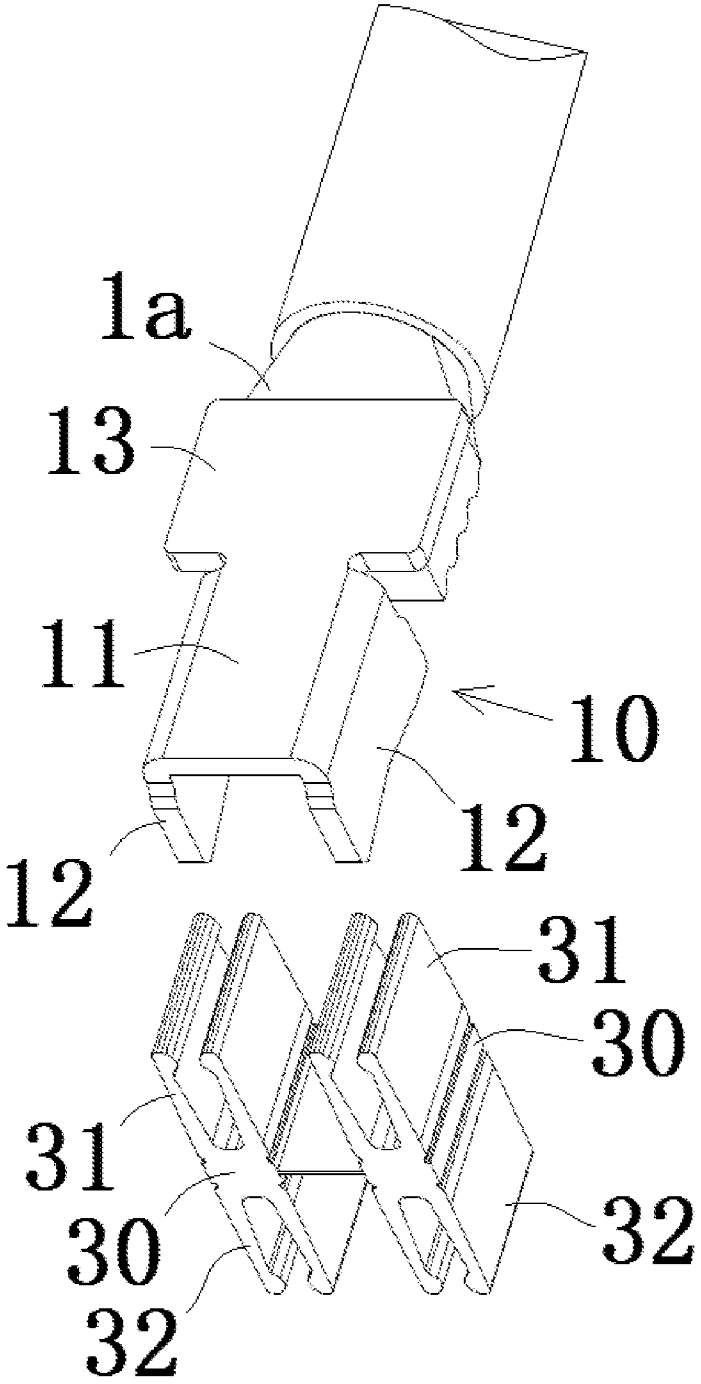
FIG. 2 shows the illustrative perspective view of the cable, the electrical connection terminal connected with the cable and the mating terminal mated with the electrical connection terminal shown in FIG. 1.
Figure 3:
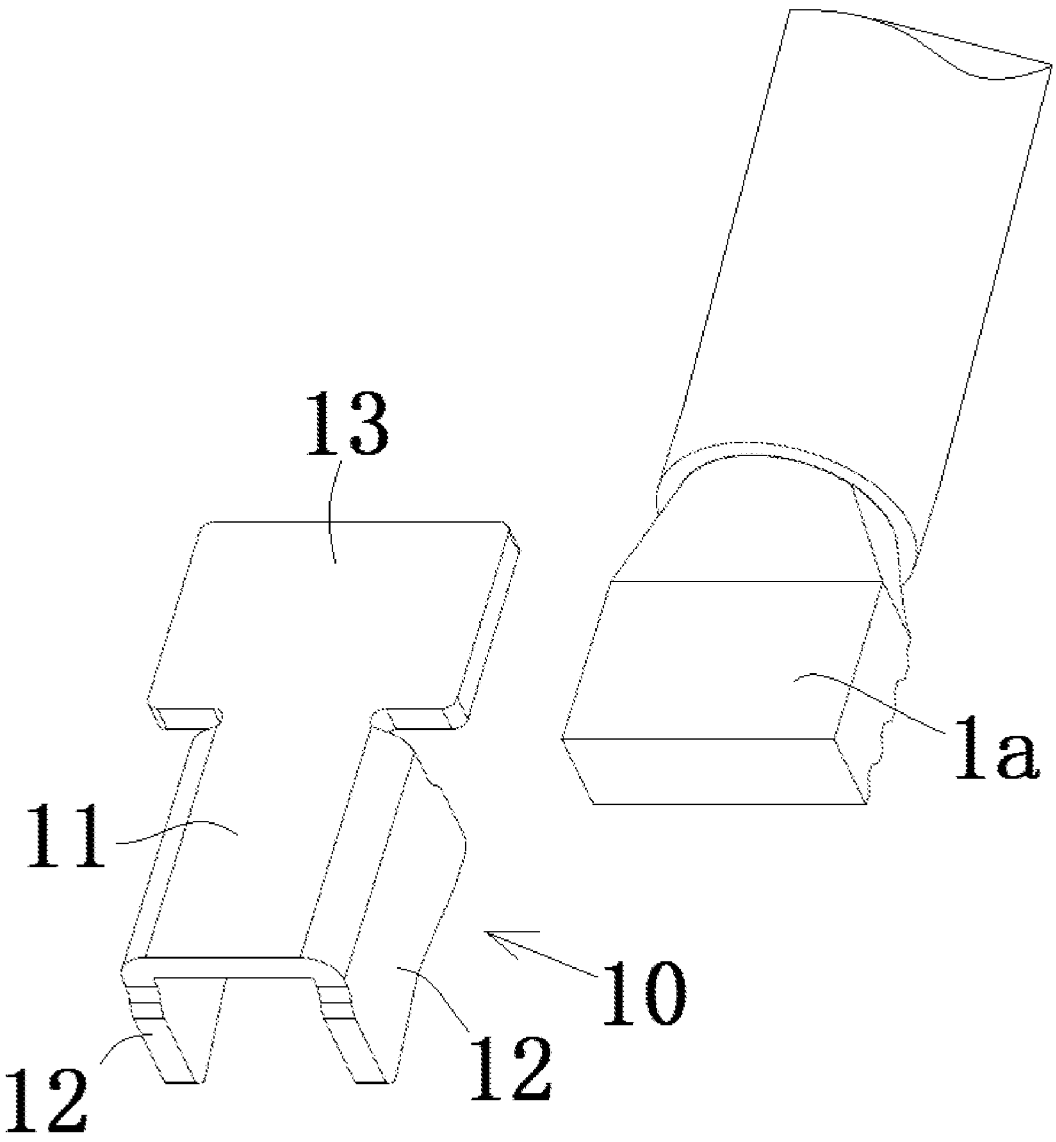
FIG. 3 shows the illustrative perspective view of the cable and the electrical connection terminal shown in FIG. 2.
Figure 4:
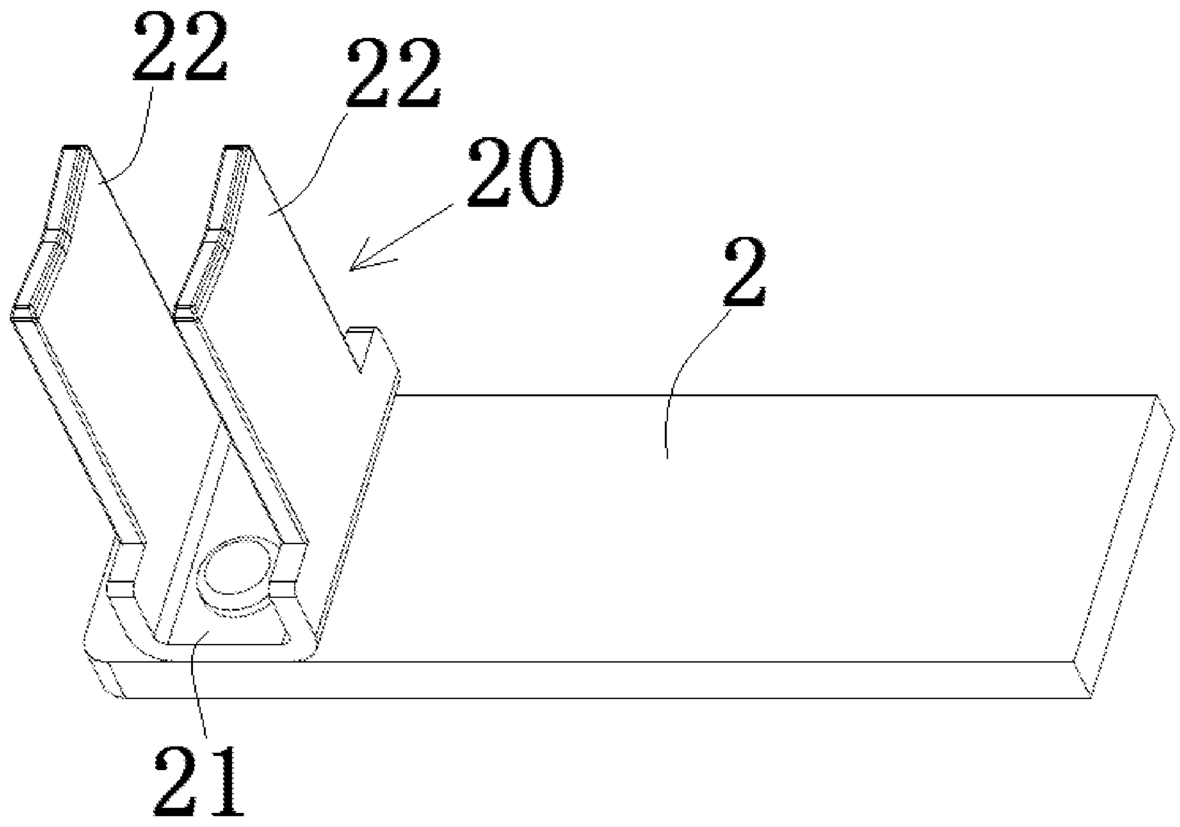
FIG. 4 shows the illustrative perspective view of the bus bar shown in FIG. 1 and the electrical connection terminal connected with the bus bar.

FIG. 2 shows an illustrative perspective view of the cable 1, the first electrical connection terminal 10 connected to the cable 1 and the mating terminal 30 matched with the first electrical connection terminal 10 shown in FIG. 1; FIG. 3 shows an illustrative perspective view of the cable 1 and the electrical connection terminal 10 shown in FIG. 2; FIG. 4 shows an illustrative perspective view of the bus bar 2 shown in FIG. 1 and the second electrical connection terminal 20 connected to the bus bar 2.

As shown in FIGS. 1 to 4, in the illustrated embodiment, the first electrical connection terminal 10 includes a first base 11 and a plurality of first tabs 12. A plurality of first tabs 12 are connected to the first base 11 and spaced from each other.

As shown in FIGS. 1 to 4, in the illustrated embodiment, the second electrical connection terminal 20 includes a second base 21 and a plurality of second tabs 22. A plurality of second tabs 22 are connected to the second base 21 and spaced from each other.

As shown in FIGS. 1 to 4, in the illustrated embodiment, each mating terminal 30 includes a first mating end 31 matched with the first tab 12 and a second mating end 32 matched with the second tab 22. Each first tab 12 of the first electrical connection terminal 10 is suitable for mating with the first mating end 31 of the mating terminal 30 in a plug-in manner. Each second tab 22 of the second electrical connection terminal 20 is suitable for mating with the second mating end 32 of the mating terminal 30 in a plug-in manner. In the illustrated embodiment, each of the mating terminals 30 is H-shaped, the first mating end 31 of each mating terminal 30 includes a pair of first elastic clamping arms, and the first tab 12 is suitable to be inserted between the pair of first elastic clamping arms and clamped between the pair of first elastic clamping arms. Similarly, the second mating end 32 of each mating terminal 30 includes a pair of second elastic clamping arms, and the second tab 22 is adapted to be inserted between the pair of second elastic clamping arms and clamped between the pair of second elastic clamping arms.

As shown in FIGS. 1 to 4, in the illustrated embodiment, the first electrical connection terminal 10 includes two first tabs 12 arranged side by side, which are respectively connected to both sides of the width direction of the first base 11 and perpendicular to the width direction of the first base 11. In the illustrated embodiment, the two first tabs 12 extend downward along the thickness direction of the first base 11 to be suitable for simultaneous matching with the two mating terminals 30, respectively.

In the embodiment shown in FIGS. 1-4, the first electrical connection terminal 10 adopts two parallel first tabs 12, so the length of the first electrical connection terminal 10 and the current flow path through which are reduced, and the current flow path through which after shunting is shorter. Therefore, the first electrical connection terminal 10 of the present invention has low body resistance, less heating and is more suitable for high current applications.

In addition, in the embodiment shown in FIGS. 1-4, the two first tabs 12 arranged side by side increase the cross-sectional area and surface area of the first electrical connection terminal 10, and improve the equivalent current sectional area and effective heat dissipation area of the first electrical connection terminal 10, thus making the first electrical connection terminal 10 more suitable for high current applications.

As shown in FIGS. 1 to 4, in the illustrated embodiment, the second electrical connection terminal 20 includes two second tabs 22, which are respectively connected to both sides of the width direction of the second base 21, so that the second electrical connection terminal 20 is U-shaped. The two second tabs 22 extend upward along the thickness direction of the second base 21 to be suitable for simultaneous matching with the two mating terminals 30, respectively.

In the embodiment shown in FIGS. 1-4, the second electrical connection terminal 20 adopts two parallel second tabs 22, so the length of the second electrical connection terminal 20 and the current flow path through which are reduced, and the current flow path through which after shunting is shorter. Therefore, the second electrical connection terminal 20 of the present invention has low body resistance, less heating and is more suitable for high current applications.

In addition, in the embodiment shown in FIGS. 1-4, the two second tabs 22 arranged side by side increase the cross-sectional area and surface area of the second electrical connection terminal 20, and improve the equivalent current sectional area and effective heat dissipation area of the second electrical connection terminal 20, thus making the second electrical connection terminal 20 more suitable for high current applications.

As shown in FIGS. 1 to 4, in the illustrated embodiment, the first electrical connection terminal 10 also includes a connection part 13, which is connected with the first base 11. The connection part 13 is flat, and the end 1*a* of the cable 1 is pre processed into a flat shape. The flat end 1*a* of the cable 1 is welded to the flat connection part 13. The connecting surface of the end 1*a* of the cable 1 may be welded to the upper or lower surface of the connection part 13.

As shown in FIGS. 1 to 4, in the illustrated embodiment, the width of the connection part 13 is greater than the width of the first base 11. However, the present invention is not limited to this, and the width of the connection part 13 may also be equal to or less than the width of the first base 11.

As shown in FIGS. 1 to 4, in the illustrated embodiment, the extension direction of the connection part 13 is parallel to the length direction of the first base 11. That is, the extension direction of the connection part 13 is parallel to the axial direction of the cable 1.

As shown in FIGS. 1 to 4, in the illustrated embodiment, the bus bar 2 is electrically connected with the second base 21 of the second electrical connection terminal 20. The second base 21 of the second electrical connection terminal 20 is electrically connected to the bus bar 2 by welding, riveting or threaded connection.

Figure 5:
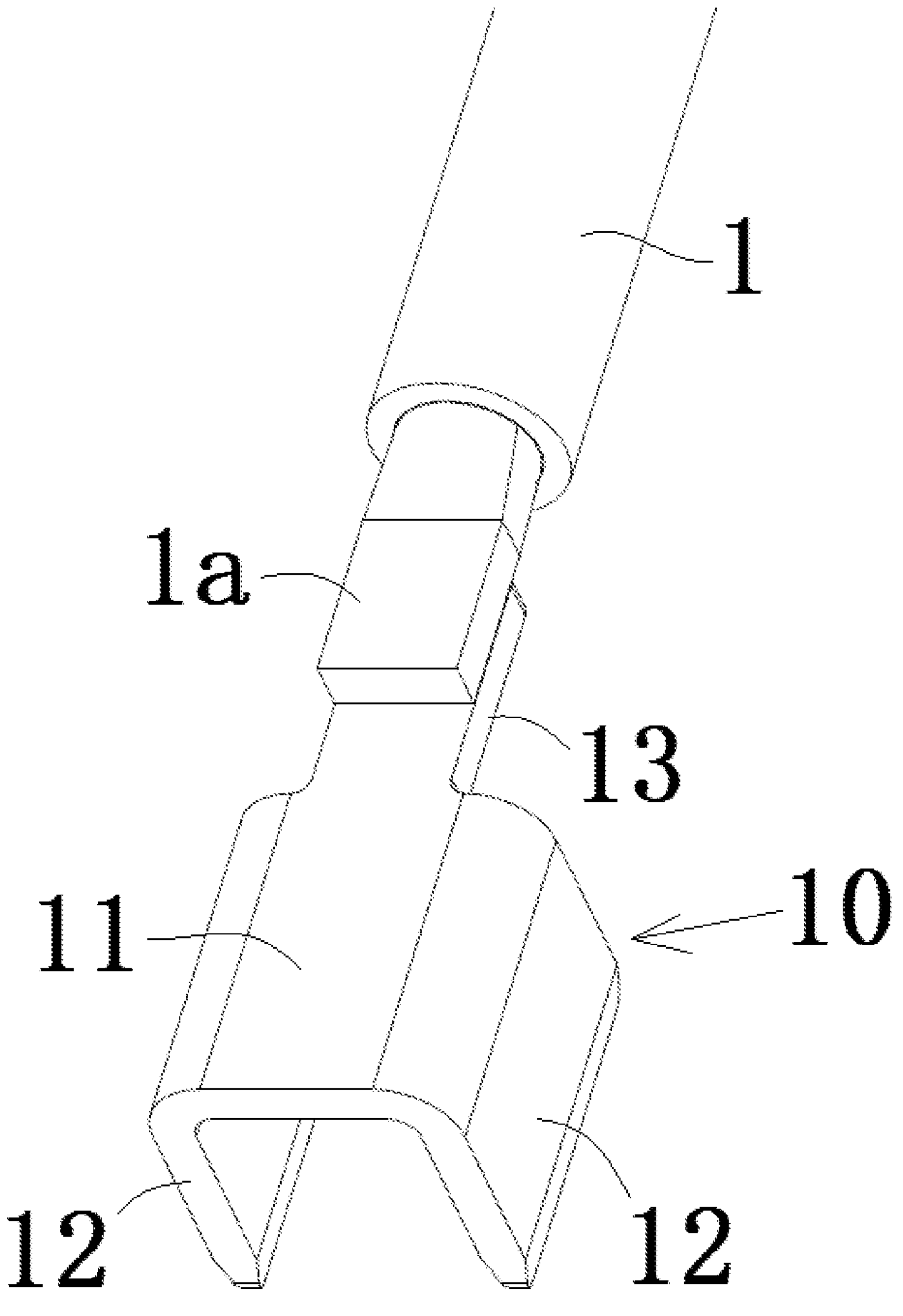
FIG. 5 shows an illustrative perspective view of a cable and an electrical connection terminal connected to the cable according to another exemplary embodiment of the present invention.

FIG. 5 shows an illustrative perspective view of a cable 1 and a first electrical connection terminal 10 connected to the cable 1 according to another exemplary embodiment of the present invention.

Compared with the embodiment shown in FIGS. 1-4, the embodiment shown in FIG. 5 is mainly different in the size of the connection part 13 of the first electrical connection terminal 10 and the welding position of the cable 1.

In the embodiment shown in FIG. 5, the connection part 13 of the first electrical connection terminal 10 is flat, and the width of the connection part 13 is less than that of the first base 11. The end 1*a* of the cable 1 is flat and welded to the upper surface of the flat connection part 13.

Figure 6:
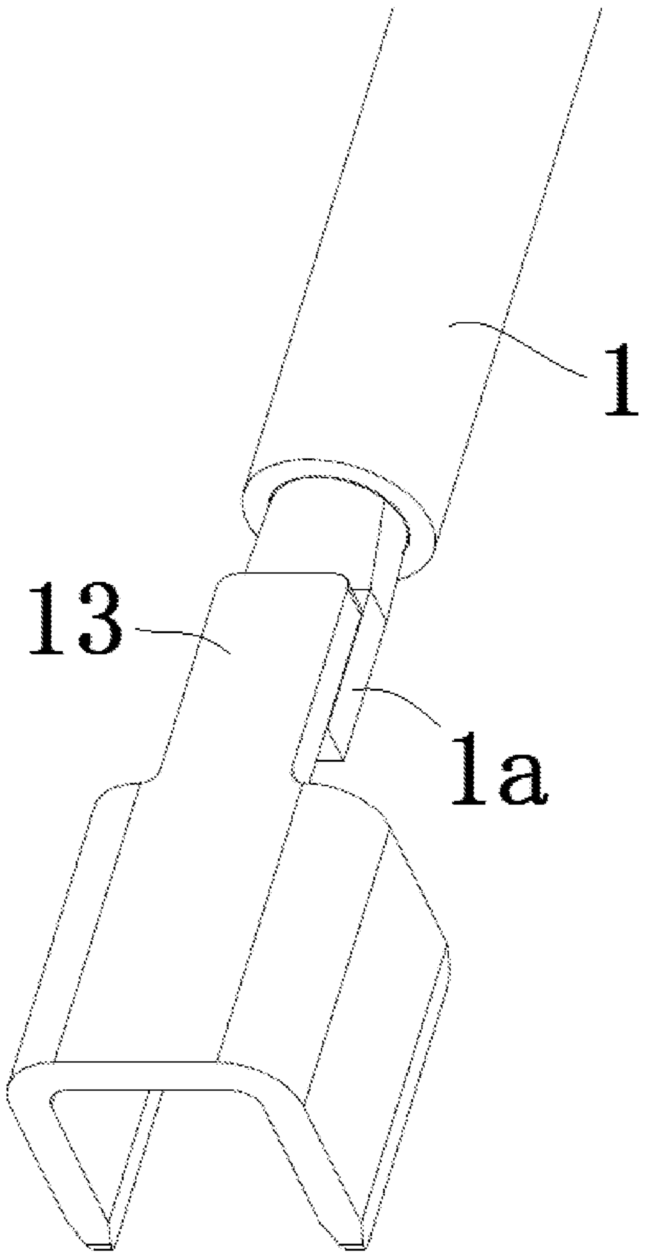
FIG. 6 shows an illustrative perspective view of a cable and an electrical connection terminal connected to the cable according to another exemplary embodiment of the present invention.

FIG. 6 shows an illustrative perspective view of a cable 1 and a first electrical connection terminal 10 connected to the cable 1 according to another exemplary embodiment of the present invention.

Compared with the embodiment shown in FIG. 5, the embodiment shown in FIG. 6 is mainly different in the welding position of cable 1. In the embodiment shown in FIG. 6, the end 1*a* of the cable 1 is welded to the lower surface of the plate-shaped connection part 13.

Figure 7:
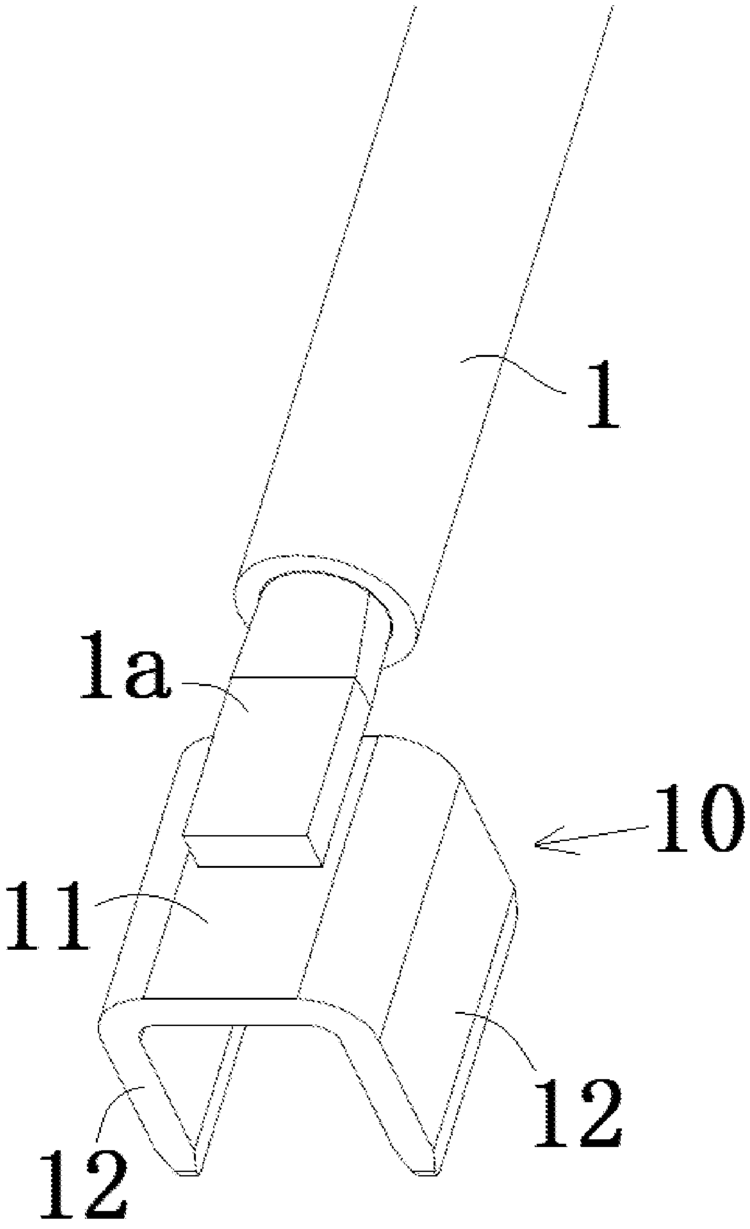
FIG. 7 shows an illustrative perspective view of a cable and an electrical connection terminal connected to the cable according to another exemplary embodiment of the present invention.

FIG. 7 shows an illustrative perspective view of a cable 1 and a first electrical connection terminal 10 connected to the cable 1 according to another exemplary embodiment of the present invention.

Compared with the embodiment shown in FIG. 5, the embodiment shown in FIG. 7 is mainly different in that the connection part 13 of the first electrical connection terminal 10 is cancelled. In the embodiment shown in FIG. 7, the first electrical connection terminal 10 does not have a connection part 13, and the end 1*a* of the cable 1 is directly welded to the upper or lower surface of the first base 11 of the first electrical connection terminal 10.

Figure 8:
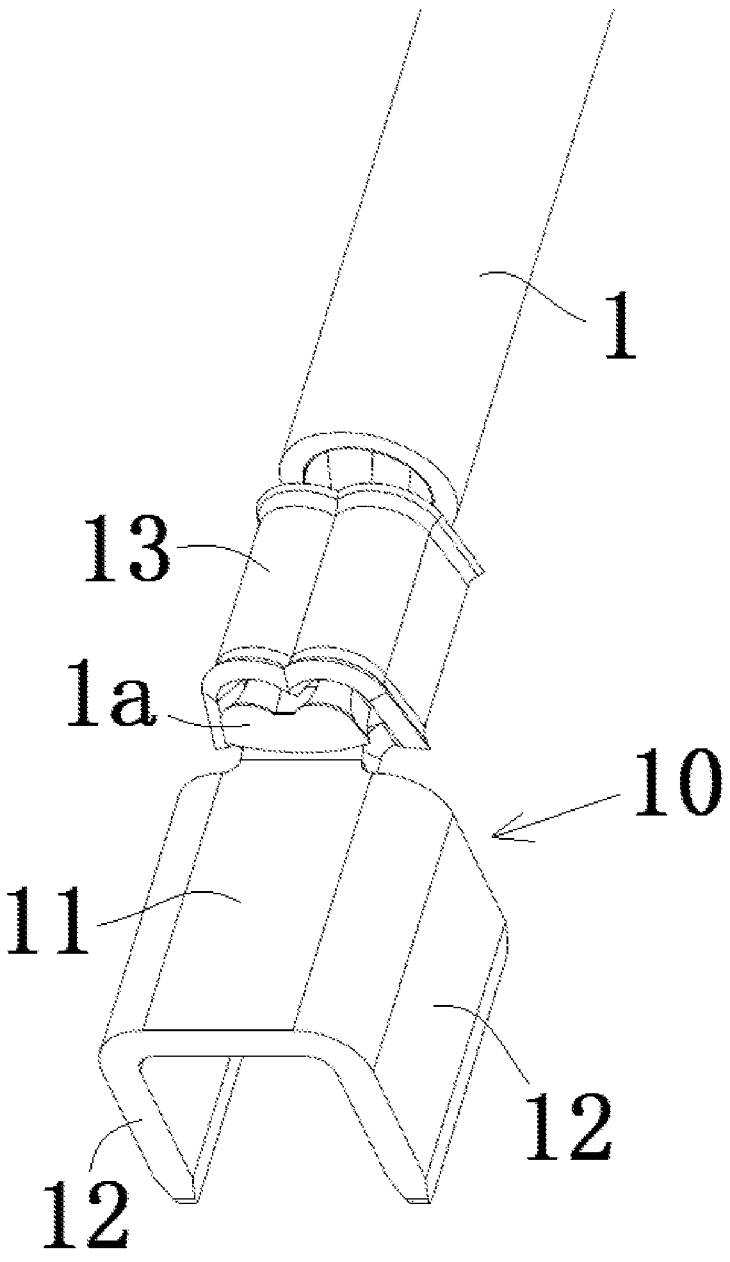
FIG. 8 shows an illustrative perspective view of a cable and an electrical connection terminal connected to the cable according to another exemplary embodiment of the present invention.

FIG. 8 shows an illustrative perspective view of a cable 1 and a first electrical connection terminal 10 connected to the cable 1 according to another exemplary embodiment of the present invention.

Compared with the embodiment shown in FIG. 5, the embodiment shown in FIG. 8 is mainly different in the structure of the connection part 13 of the first electrical connection terminal 10. In the embodiment shown in FIG. 8, the connection part 13 of the first electrical connection terminal 10 is in the shape of side wing and includes a pair of side wings. The end 1*a* of the cable 1 is flat. The pair of side wings of the connection part 13 are crimped to the end 1*a* of the cable 1.

Figure 9:
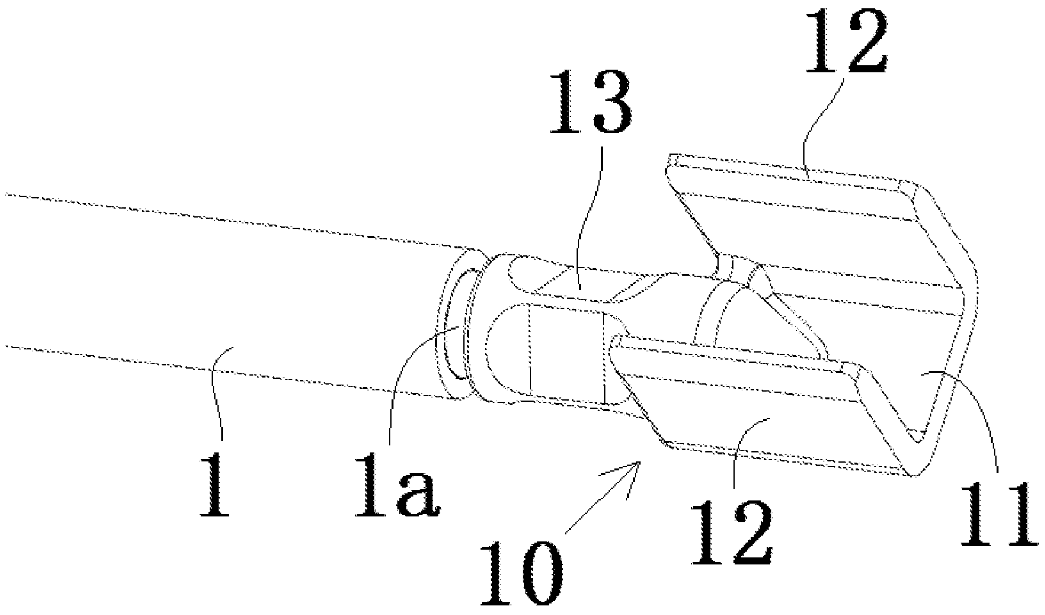
FIG. 9 shows an illustrative perspective view of a cable and an electrical connection terminal connected to the cable according to another exemplary embodiment of the present invention.

FIG. 9 shows an illustrative perspective view of a cable 1 and a first electrical connection terminal 10 connected to the cable 1 according to another exemplary embodiment of the present invention.

Compared with the embodiment shown in FIG. 5, the embodiment shown in FIG. 9 is mainly different in the structure of the connection part 13 of the first electrical connection terminal 10. In the embodiment shown in FIG. 9, the connection part 13 of the first electrical connection terminal 10 is cylindrical. The end 1*a* of the cable 1 is cylindrical and inserted into the cylindrical connection part 13. The cylindrical connection part 13 is crimped to the end 1*a* of the cable 1.

Figure 10:
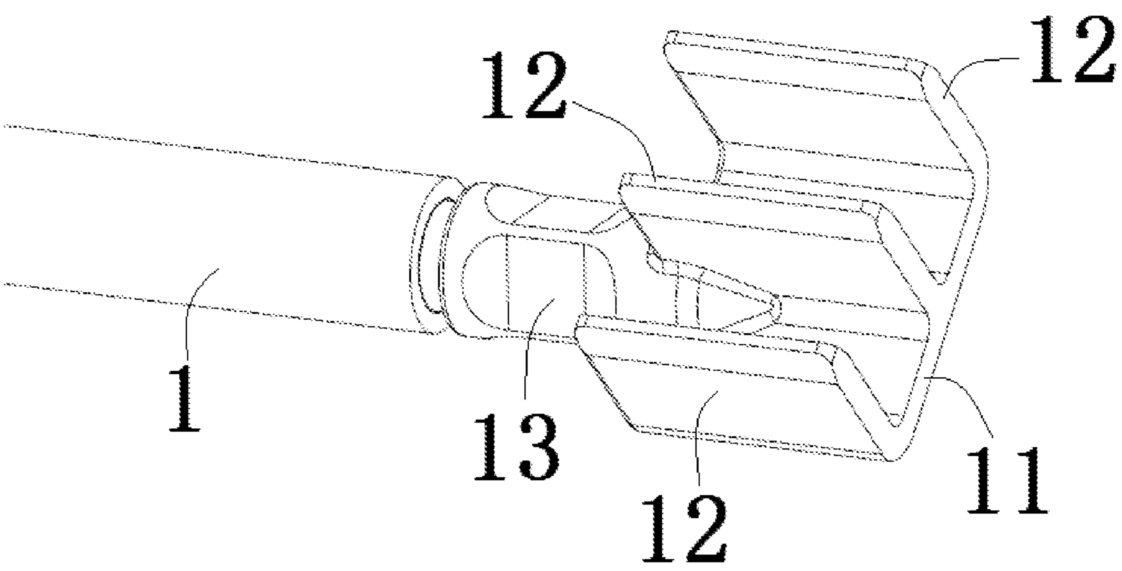
FIG. 10 shows an illustrative perspective view of a cable and an electrical connection terminal connected to the cable according to another exemplary embodiment of the present invention.

FIG. 10 shows an illustrative perspective view of a cable 1 and a first electrical connection terminal 10 connected to the cable 1 according to another exemplary embodiment of the present invention.

Compared with the embodiment shown in FIG. 9, the embodiment shown in FIG. 10 is mainly different in the number of first tabs 11 on the first electrical connection terminal 10. In the embodiments shown in FIGS. 1 to 9, the first electrical connection terminal 10 includes two first tabs 11 arranged side by side, but in the embodiment shown in FIG. 10, the first electrical connection terminal 10 includes three first tabs 11 arranged side by side.

In the embodiment shown in FIG. 10, the first electrical connection terminal 10 includes three first tabs 12. The three first tabs 12 are arranged side by side and perpendicular to the width direction of the first base 11. Two of the three first tabs 12 are respectively connected to both sides in the width direction of the first base 11, and the remaining one of the three first tabs 12 is connected to the middle part in the width direction of the first base 11.

Figure 11:
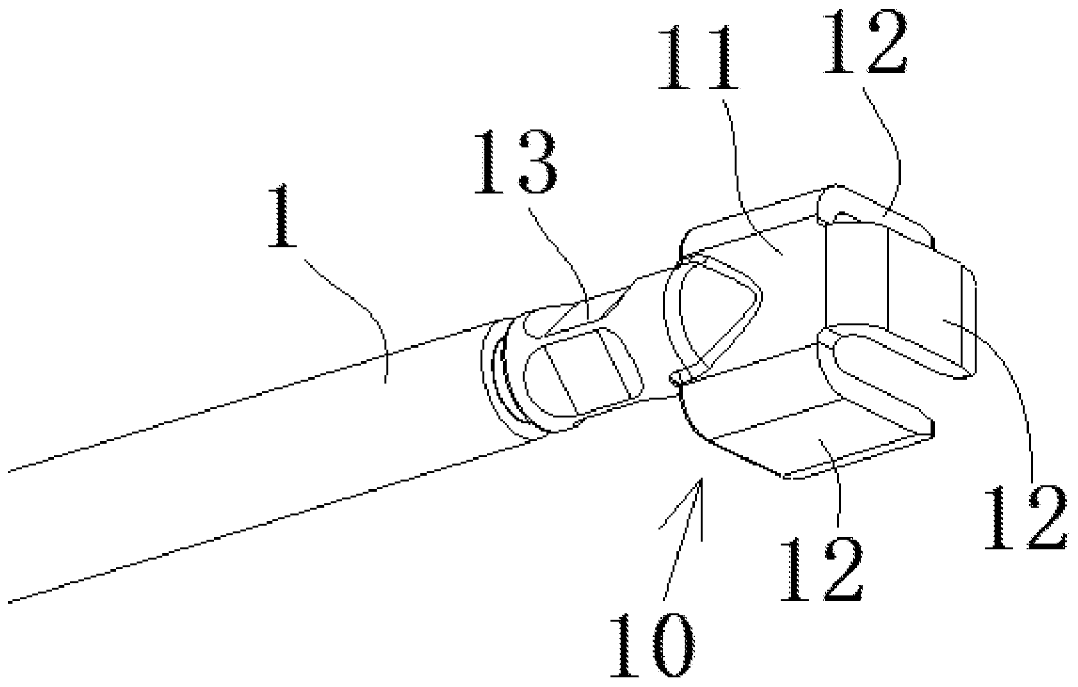
FIG. 11 shows an illustrative perspective view of a cable and an electrical connection terminal connected to the cable according to another exemplary embodiment of the present invention.

FIG. 11 shows an illustrative perspective view of a cable 1 and a first electrical connection terminal 10 connected to the cable 1 according to another exemplary embodiment of the present invention.

Compared with the embodiment shown in FIG. 10, the embodiment shown in FIG. 11 is mainly different in the structure of the connection part 13 of the first electrical connection terminal 10. In the embodiment shown in FIG. 11, the first electrical connection terminal 10 includes three first tabs 12, two of the three first tabs 12 are arranged side by side and perpendicular to the width direction of the first base 11, and the remaining one of the three first tabs 12 is arranged perpendicular to the length direction of the first base 11.

In the embodiment shown in FIG. 11, two of the three first tabs 12 are respectively connected to both sides in the width direction of the first base 11, and the remaining one of the three first tabs 12 is connected to one end in the length direction of the first base 11.

Figure 12:
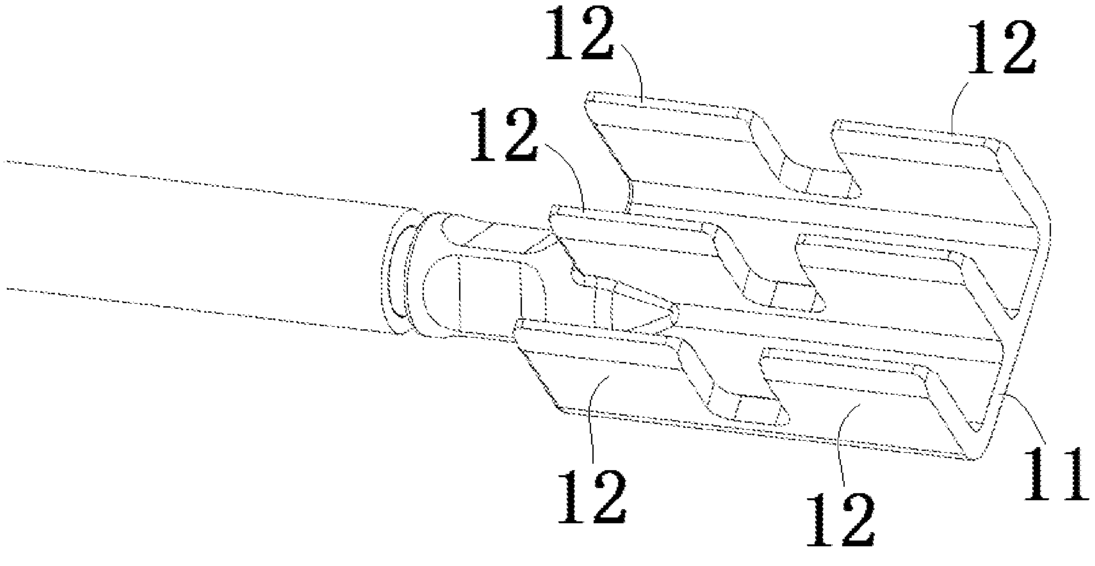
FIG. 12 shows an illustrative perspective view of a cable and an electrical connection terminal connected to the cable according to another exemplary embodiment of the present invention.

FIG. 12 shows an illustrative perspective view of a cable 1 and a first electrical connection terminal 10 connected to the cable 1 according to another exemplary embodiment of the present invention.

Compared with the embodiment shown in FIG. 10, the embodiment shown in FIG. 12 is mainly different in the structure of the connection part 13 of the first electrical connection terminal 10. In the embodiment shown in FIG. 12, the first electrical connection terminal 10 includes six first tabs 12, and the six first tabs 12 are arranged in two rows along the width direction and three columns along the length direction of the first base 11.

It should be noted that the number and arrangement of the first tabs 12 on the first electrical connection terminal 10 are not limited to the illustrated embodiment. For example, the number of the first tabs 12 on the first electrical connection terminal 10 may be four, five, seven or more, and a plurality of the first tabs 12 may also be arranged in a crisscross manner.

Figure 13:
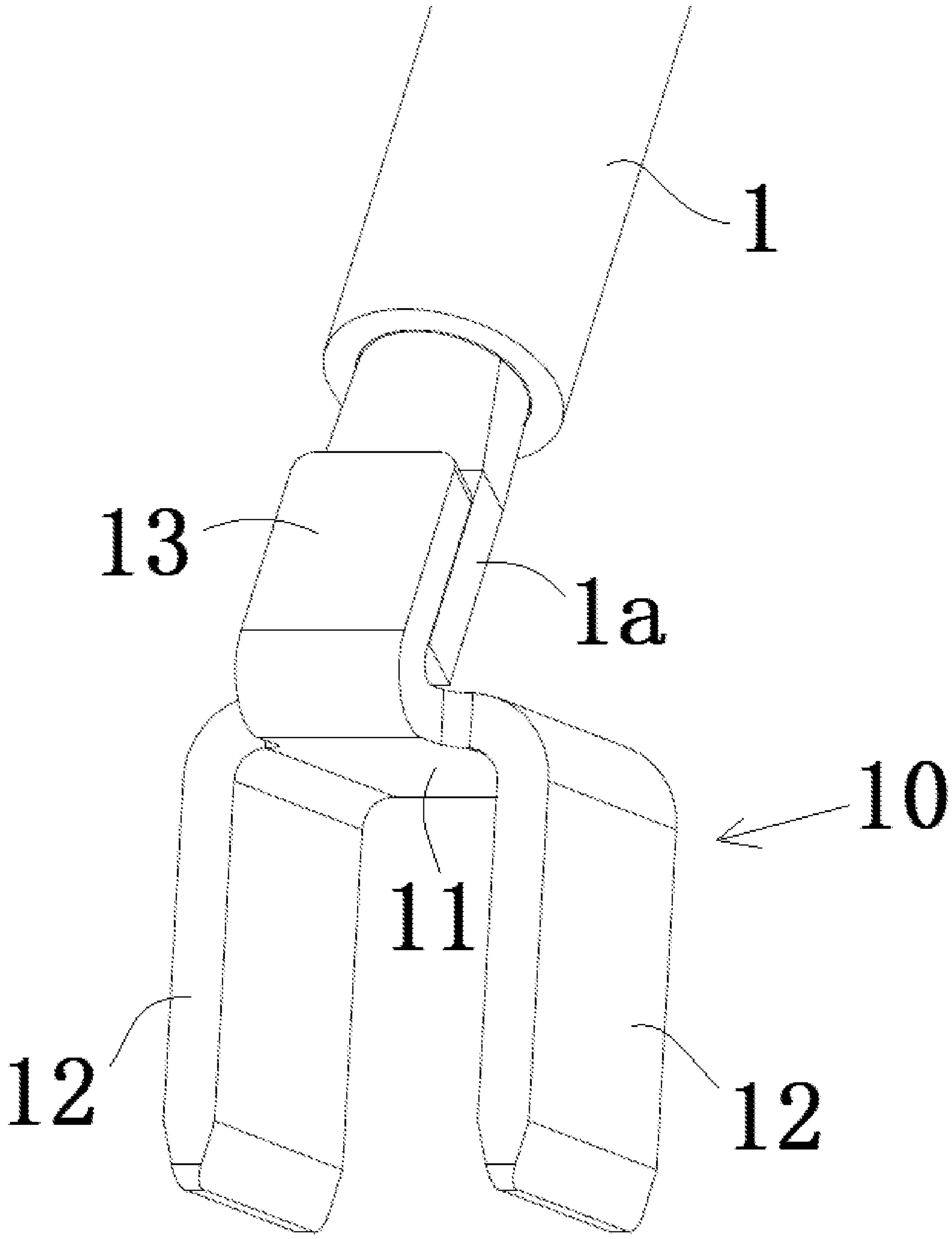
FIG. 13 shows an illustrative perspective view of a cable and an electrical connection terminal connected to the cable according to another exemplary embodiment of the present invention.

FIG. 13 shows an illustrative perspective view of a cable 1 and a first electrical connection terminal 10 connected to the cable 1 according to another exemplary embodiment of the present invention.

Compared with the embodiment shown in FIG. 5, the embodiment shown in FIG. 13 is mainly different in the extension direction of the connection part 13 of the first electrical connection terminal 10. In the embodiment shown in FIG. 5, the extension direction of the connection part 13 of the first electrical connection terminal 10 is parallel to the length direction of the first base 11. However, in the embodiment shown in FIG. 13, the connection part 13 of the first electrical connection terminal 10 is bent by about 90 degrees relative to the first base 11, and an angle of the extension direction of the connection part 13 of the first electrical connection terminal 10 with respect to the length direction of the first base 11 is about 90 degrees. Please note that the present invention is not limited to the illustrated embodiment. For example, the extension direction of the connection part 13 of the first electrical connection terminal 10 can be changed according to actual needs. For example, the angle between the extension direction of the connection part 13 of the first electrical connection terminal 10 and the length direction of the first base 11 may be equal to 10 degrees, 20 degrees or 30 degrees.

Figure 14:
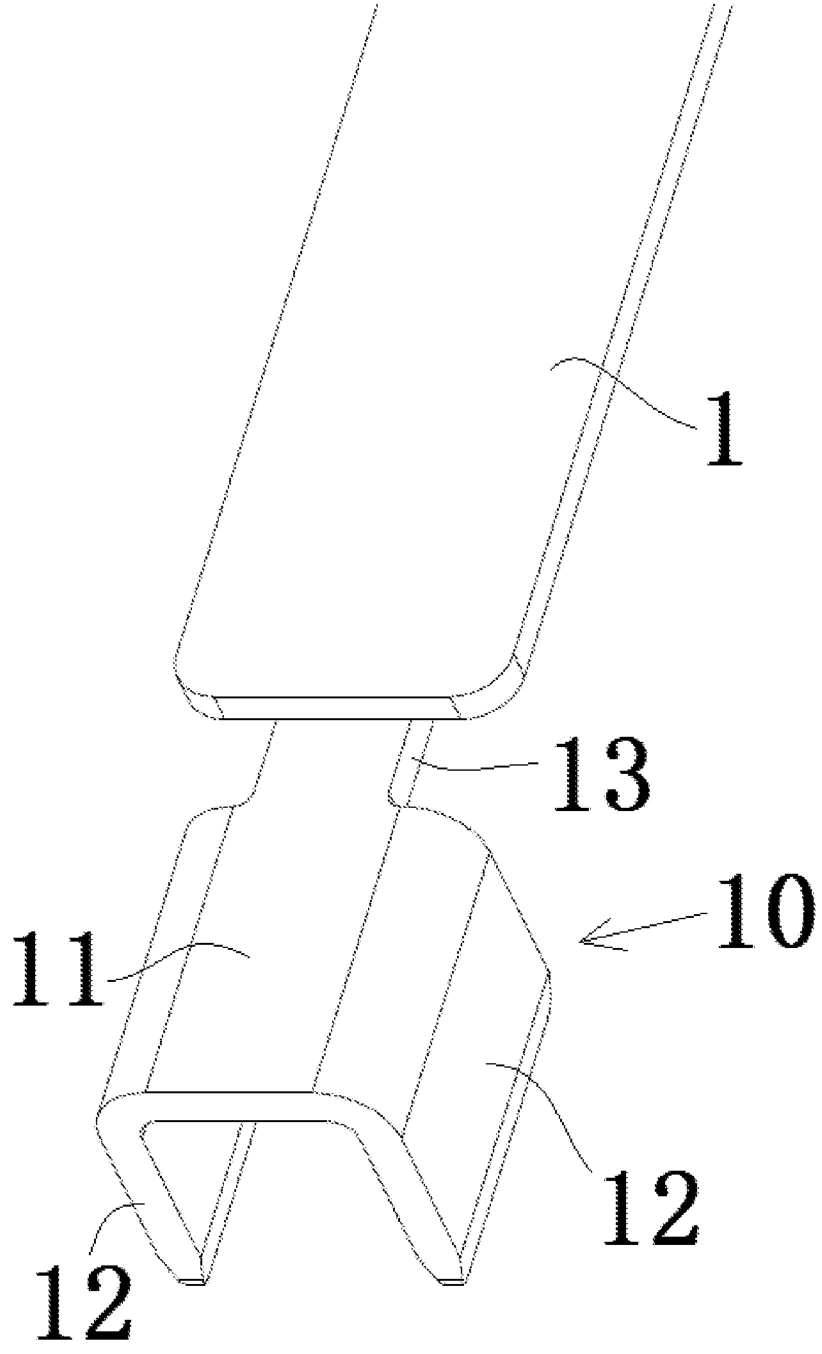
FIG. 14 shows an illustrative perspective view of a cable and an electrical connection terminal connected to the cable according to another exemplary embodiment of the present invention.

FIG. 14 shows an illustrative perspective view of a cable 1 and a first electrical connection terminal 10 connected to the cable 1 according to another exemplary embodiment of the present invention.

Compared with the embodiment shown in FIG. 5, the embodiment shown in FIG. 14 is mainly different in the shape of the cable 1. In the embodiment shown in FIG. 5, the cable 1 is an ordinary circular cable. In the embodiment shown in FIG. 14, the cable 1 is a flat cable. Therefore, the end of the flat cable 1 can be directly welded to the connection part 13 of the first electrical connection terminal 10 without being processed into a flat shape in advance.

Although not shown, in another exemplary embodiment of the present invention, an electrical connector is also disclosed, which includes a housing and a first electrical connection terminal 10 provided in the housing.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connection assembly, comprising:
a first electrical connection terminal comprising:
a first base; and
a plurality of first tabs connected to the first base and separated from each other; and
a mating terminal comprising a first mating end and a second mating end, the first mating end mated with at least one first tab of the plurality of first tabs and the second mating end configured to mate with a second tab of a second electrical connection terminal, the mating terminal having at least one first elastic clamping arm extending to the first mating end and at least one second elastic clamping arm extending to the second mating end.

2. The electrical connection assembly according to claim 1, further comprising the second electrical connection terminal has a second base with a plurality of second tabs connected to the second base and separated from each other.

3. The electrical connection assembly according to claim 1,
wherein the plurality of first tabs are separated from each other.

4. The electrical connection assembly according to claim 3,
wherein the plurality of first tabs extend downward along a thickness direction of the first base.

5. The electrical connection assembly according to claim 3,
wherein the first plurality of tabs of the first electrical connection terminal comprises two first tabs arranged side by side, which are respectively connected to both sides of the width direction of the first base and perpendicular to the width direction of the first base.

6. The electrical connection assembly according to claim 3,
wherein the plurality of first tabs are arranged side by side and perpendicular to the width direction of the first base.

7. The electrical connection assembly according to claim 6,
wherein the plurality of first tabs are three first tabs, two of the three first tabs are respectively connected to both sides of the width direction of the first base, and the remaining one of the three first tabs is connected to the middle part of the width direction of the first base.

8. The electrical connection assembly according to claim 3,
wherein the plurality of first tabs are three first tabs, two of the three first tabs are arranged side by side and perpendicular to the width direction of the first base, and the remaining one of the three first tabs is arranged perpendicular to the length direction of the first base.

9. The electrical connection assembly according to claim 8,
wherein two of the three first tabs are respectively connected to both sides of the width direction of the first base, and the remaining one of the three first tabs is connected to one end of the length direction of the first base.

10. The electrical connection assembly according to claim 3,
wherein the plurality of first tabs are arranged in a row along the width direction of the first base; or
wherein the plurality of first tabs are arranged in a column along the length direction of the first base; or
wherein the plurality of first tabs are arranged in multiple rows along the width direction of the first base and columns along the length direction of the first base.

11. The electrical connection assembly according to claim 3, further comprising:
a connection part, which is connected to the first base and adapted to be electrically connected to an end of a cable.

12. The electrical connection assembly according to claim 11,
wherein the connection part is in a flat plate shape, and the flat plate-shaped connection part is adapted to be welded onto the end of the cable; or
wherein the connection part is cylindrical, and the cylindrical connection part is adapted to be crimped onto the end of the cable; or
wherein the connection part is side wing-shaped, and the side wing-shaped connection part is adapted to be crimped onto the end of the cable.

13. The electrical connection assembly according to claim 11,
wherein the connection part extends in a direction parallel to the length direction of the first base; or
wherein the connection part extends at a predetermined angle with respect to the length direction of the first base.

14. The electrical connection assembly according to claim 3, wherein at least some of the plurality of first tabs are arranged side by side and parallel to each other.

* * * * *